(12) United States Patent
Glover et al.

(10) Patent No.: US 8,313,709 B2
(45) Date of Patent: Nov. 20, 2012

(54) DECONTAMINATION OF PROCESS STREAMS

(75) Inventors: John N. Glover, Spring, TX (US);
William D. Duke, Kingwood, TX (US);
Peter G. Ham, Houston, TX (US)

(73) Assignee: Crystaphase International, Inc., Houston, TX (US)

( * ) Notice: Subject to any disclaimer, the term of this patent is extended or adjusted under 35 U.S.C. 154(b) by 1130 days.

(21) Appl. No.: 12/154,203

(22) Filed: May 21, 2008

(65) Prior Publication Data

US 2008/0296216 A1    Dec. 4, 2008

Related U.S. Application Data

(60) Division of application No. 10/867,015, filed on Jun. 14, 2004, now Pat. No. 7,393,510, which is a continuation-in-part of application No. 10/396,851, filed on Mar. 25, 2003, now Pat. No. 7,265,189.

(51) Int. Cl.
| | |
|---|---|
| *B01D 50/00* | (2006.01) |
| *B01J 35/02* | (2006.01) |
| *B01J 8/08* | (2006.01) |
| *B01J 8/44* | (2006.01) |
| *C08F 2/00* | (2006.01) |

(52) U.S. Cl. ........ 422/311; 422/177; 422/216; 422/217; 422/218; 526/64; 526/67; 526/71

(58) Field of Classification Search .................. 422/311, 422/177, 216, 217, 218; 526/64, 67, 71
See application file for complete search history.

(56) References Cited

U.S. PATENT DOCUMENTS

| | | | |
|---|---|---|---|
| 3,171,820 A | 3/1965 | Volz | |
| 3,410,057 A | 11/1968 | Lerner | |
| 4,251,239 A | 2/1981 | Clyde et al. | |
| 4,615,796 A * | 10/1986 | Kramer | 208/146 |
| 6,258,900 B1 * | 7/2001 | Glover | 526/67 |
| 6,291,603 B1 | 9/2001 | Glover | |

OTHER PUBLICATIONS

Selected relevant excerpts from file history of U.S. Appl. No. 11/893,190, filed Aug. 15, 2007, and assigned to Applicant for present application.
Notice of Allowance for U.S. Appl. No. 10/867,015 (now U.S. Patent No. 7,393,510, issued Jul. 1, 2008).

* cited by examiner

*Primary Examiner* — Ling Choi
*Assistant Examiner* — Monique Peets
(74) *Attorney, Agent, or Firm* — Greenberg Traurig L.L.P.

(57) ABSTRACT

A method for removing contaminants from a process stream that includes the use of reticulated material to filter the process stream in a vessel located upstream of a process unit. The reticulated material can be used with other conventional filter media within the vessel.

4 Claims, 6 Drawing Sheets

DECONTAMINATION OF PROCESS STREAMS

RELATED APPLICATION

This application is a divisional application of, and claims the benefit of, U.S. application Ser. No. 10/867,015 filed Jun. 14, 2004 now U.S. Pat. No. 7,393,510, which is a continuation-in-part of U.S. application Ser. No. 10/396,851, filed Mar. 25, 2003, now U.S. Pat. No. 7,265,189.

BACKGROUND OF THE INVENTION

1. Field of the Invention

The invention relates to a method of providing filtration of contaminants from process streams. More specifically, the invention relates to a method of providing filtration of contaminants from process streams upstream of process units.

2. Description of Related Art

Refineries, petrochemical plants and other similar type plants process large amounts of both liquids and/or vapor phase process streams through a variety of process units. Feed filters and other pre-filter systems, which are also referred to as guard beds or guard filters, are frequently used to remove undesired particulates from the process streams prior to being fed to a process unit. As used herein, these feed filters and pre-filter systems will be referred to as guard filters. Guard filters that are used in adsorption applications can be run at ambient or somewhat elevated temperatures while the downstream process units can run at elevated temperatures, elevated pressures or different atmosphere conditions, such as high hydrogen partial pressures. Guard filters that are used in absorption applications are often run at elevated temperatures, such as in the downstream process units.

Often a filtration system is employed within the actual process unit (in-situ), such as "top bed" materials in a down flow reactor. Guard filters can be used to replace this type of in-situ system. More likely guard filters are used to augment the in-situ system when large volumes of particulates are typically seen that will overwhelm even the most robust of these in-situ process unit systems.

Guard filters can use either a fixed filter system or a deep bed filter system or a combination of the two systems.

Fixed filter systems can include cartridge, bag, canister, belt filters, precoat filters, centrifuges, air filters, dust bag collectors, membrane filters, and other type of filter systems. While high filtration efficiencies can be achieved, the filtration capacity of these fixed filter units is relatively small, which typically requires changing out filter elements or backwashing or otherwise cleaning the filters on a regular and frequent basis. The cost of filtration elements and the cost of the effort to change out or clean these guard filters can be expensive. Sometimes the process stream itself is used to backwash the filtration system, which results in the backwash stream becoming contaminated with particulates and often downgraded in value. It is estimated, for example, that some petroleum refineries incur a downgrade cost of over one million dollars per year to operate a fixed feed filter system on a 40,000 barrel per day hydroprocessing unit. Additionally, if only one fixed feed filter system is used, there is a significant time period during cleaning, backwashing, or filter element replacement when unfiltered feed is fed to the downstream process unit. These periods of unfiltered feed can contribute to pre-mature performance problems in the process unit, which results in more frequent downtime and higher maintenance costs.

Some facilities have employed deep bed filters instead of, or in addition to, fixed filter systems due to their higher capacity. The filter medium in fixed filter systems traps particulates in a very thin layer, i.e., a fraction of an inch, on the surface of the filter element. Deep bed filters effectively filter to a depth of inches. The media in deep bed filters have typically been sand, gravel, catalyst, spent catalyst, off spec catalyst, regenerated catalyst, catalyst carriers, ceramic rings, and combinations thereof.

Shortcomings of conventional guard filters include clogging of the filter medium, the limited capacity of the filter medium to remove particulates, the inability of deep bed filter media to trap particles less than about 25 microns in size, and inability of many fixed filter media to withstand elevated temperatures when required.

In conventional guard filters, the filter medium eventually clogs or blocks flow through the filter medium. When the filter medium clogs, the flow rate of the stream through the filter medium drops and the pressure drop across the guard filter rises eventually to unacceptable levels at which point the guard filter must be taken off-line for filter media replacement or cleaning.

Conventional filter media have limited capacity to remove particulates. Cartridge, bag, and mesh filters fill their void spaces quickly and must be replaced or cleaned frequently. Conventional deep bed filters can have a greater capacity but experience shows that such systems have the ability to trap particulates in only the top six to twelve inches of the bed. It is this layer that clogs first as the particulates fill the void spaces through which the process stream is trying to flow. This produces an impenetrable cake of particulates and causes the filter system pressure drop to eventually rise to unacceptable levels.

Contaminants in process streams can be deleterious to processes and also to process units. Contaminants can damage process units, potentially resulting in an environmental or safety incident. Contaminants can also damage processes by decreasing efficiencies within processes, deactivating or poisoning catalysts, reducing the yield of desired products, reducing the conversion rates of desired components, increasing the rate of generation of undesired products, stopping production, affecting the specifications of products, or the like. Contaminants can be found in all types of process streams, such as feed streams, recycle streams, discharge streams, or effluent streams. Contaminants can affect various types of process units, such as reactors, extractors, distillation columns, scrubbers, tail gas treaters, incinerators, tanks, vessels, heat exchangers, furnaces, packaging facilities, pipelines, catalytic process units, extractors, scrubbers, boilers, condensers, and the like.

It is highly desirable to have filter media that do not clog with contaminants, but efficiently and effectively filter contaminants from the process stream. Efficiency relates to the percent of contaminants removed by such filter media from the process stream, as well as, to the range of sizes of contaminants that can be removed by such filter media. Effectiveness relates to the extent that such media does not impede the flow of the decontaminated process stream through the media. Such media would desirably remove essentially all contaminants within a broad range of sizes from the process stream, while not causing an unacceptable pressure drop increase across the guard filter. The method of the present invention for filtration for process streams, when compared with previously proposed prior art methods, has the advantages of providing highly efficient and highly effective filtering of contaminants.

Disadvantages associated with current perpendicular flow distribution designs and methods in deep bed filter units can result in poor distribution within the guard filter. Clogging or other fouling, such as that caused by particulate contaminants or the products of undesired polymerization reactions, may also cause maldistribution. The maldistribution may result in channeling and corresponding bypassing of portions of the filter media, reduction in the efficiency of contaminant removal, and reduction in efficiency of the guard filter. Therefore, the art has sought a perpendicular flow distribution method that can distribute the process stream more uniformly within the guard filter, provide efficient filtering of contaminants, and reduce fouling caused by undesired polymerization reactions.

It has been proposed to use reticulated ceramic materials to filter and distribute organic feed streams in a chemical reactor. A need exists for improved filtering and flow distribution capabilities for other types of process streams besides organic-based streams and for guard filters, not just chemical reactors.

There is also a need for an improved guard filter that avoids or minimizes the shortcomings associated with conventional guard filters, such as high operating costs and limited filtering capabilities.

SUMMARY OF INVENTION

In accordance with the invention, the present invention advantageously provides a method of removing contaminants from a process stream. The method of removing contaminants preferably includes providing a plurality of reticulated elements in a vessel. The vessel is preferably located upstream of a process unit in which a decontaminated process stream can be processed, stored, transported, or the like. The vessel can be a separate vessel or a segment of pipe. The vessel can also be referred to as a guard filter. The vessel is preferably randomly packed with the plurality of reticulated elements within the vessel so that the plurality of reticulated elements provides enhanced filtration of contaminants within a process stream on a surface of the plurality of reticulated elements. The vessel may also contain quantities of other materials including conventional filter media, support balls, distributors and the like. The contaminated process stream contacts the plurality of reticulated elements, which removes contaminants from the contaminated process stream while allowing the contaminated process stream to pass unimpeded through the plurality of reticulated elements thereby producing a substantially decontaminated process stream. The substantially decontaminated process stream can be sent to a process unit for further processing, storage, transport or the like.

As another embodiment of the present invention, a process unit assembly is advantageously provided. The process unit assembly preferably includes a vessel, also referred to as a guard filter, located upstream of a process unit in which a decontaminated process stream can be processed. The vessel preferably has a plurality of reticulated elements randomly packed and contained therein thereby providing a void space between a substantial number of the reticulated elements to enhance filtration of contaminants within the contaminated process stream on a surface of the plurality of reticulated elements. When the contaminated process stream contacts a substantial number of the plurality of reticulated elements, contaminants within the contaminated process stream are substantially removed, thereby producing a substantially decontaminated process stream. The process unit assembly also advantageously includes a process unit located downstream of the vessel for processing the substantially decontaminated process stream.

The present invention advantageously provides a method of removing contaminants from a contaminated process stream upstream of a process unit. The method preferably is performed by passing the process stream over a plurality of reticulated elements in a guard filter. The reticulated elements are randomly packed in the guard filter such that there is significant void space between each reticulated element to enhance filtration of contaminants on a surface of the reticulated elements, while allowing the decontaminated process stream to pass unimpeded through the plurality of reticulated elements. A surface can include an inner surface and an outer surface. Reticulated elements made in accordance with the present invention will have more inner surface area available for filtering than outer surface area. Reticulated elements can include foam materials and monolithic materials. The process stream can be a liquid stream, a vapor phase, or a combination of both phases. The contaminants can include dirt, iron oxide, iron sulfide, asphaltenes, coke fines, soot, catalyst fines, sediments or other entrained foreign particulate matter, salts in distillation columns, grits in emulsions, particulates in gas streams, or sulfur or sulfides from tail gas units. The process stream can also be an organic-based process stream. The reticulated elements are preferably provided in an amount sufficient to remove some or all of the contaminants from the process stream. Another feature of the present invention may include the step of providing a decontaminated or substantially decontaminated process stream for further processing, storage, transport or the like.

An additional feature of the present invention can include the step of using reticulated foam elements in a variety of shapes. The shapes can include three dimensional bodies including substantially spherical shaped balls, raschig rings, saddle shaped pieces, cubes, rectangular shaped pieces, trapezoidal shaped pieces, dodecahedral shaped pieces, conical shaped pieces, rhomboidal shaped pieces, briquette shaped pieces, hollow cylinders, cylinders, and disks. Each shape can be sized to individual specifications.

An additional feature of the present invention can include the step of using reticulated foam elements in a variety of porosities and pore sizes. The reticulated foam elements can be manufactured such that they have a porosity of so many pores per inch ("ppi"). Pore size in this context is the general size of the cavity of the pore recognizing that pores are not perfect spheres. Another important element of pore size is the size of the window opening into the pore. It is this measure that determines the size of the largest particle that can be trapped or filtered within the pore. The porosity range of the reticulated foam elements of the present invention are from 4 to 800 ppi. This enables customization of the size and shape of the reticulated foam elements for the application constraints including particulate loading and pressure drop constraints. The pores of the reticulated foam elements can be in a range of about 6 millimeters to about 100 microns, each being defined by a plurality of web members forming a plurality of flow passageways through the reticulated foam elements.

An additional feature of the present invention can include the step of using reticulated elements with different filtering capability in the same guard filter so as to remove contaminant materials of a broad range of sizes. This includes elements including various types of reticulated foam materials plus reticulated monolithic materials. The materials of the present invention can filter contaminants down to about 1 micron in size. Commercially available deep bed filter media are capable of trapping particles down to about 25 micron in size Randomly packed elements of reticulated materials, including foams and monoliths of any composition, can be used alone or in combination with conventional filter media in guard filters.

While the invention will be described in connection with the preferred embodiment, it will be understood that it is not intended to limit the invention to that embodiment. On the contrary, it is intended to cover all alternatives, modifications, and equivalents, as may be included within the spirit and the scope of the invention as defined by the appended claims.

DETAILED DESCRIPTION AND SPECIFIC EMBODIMENTS

Figure 1:
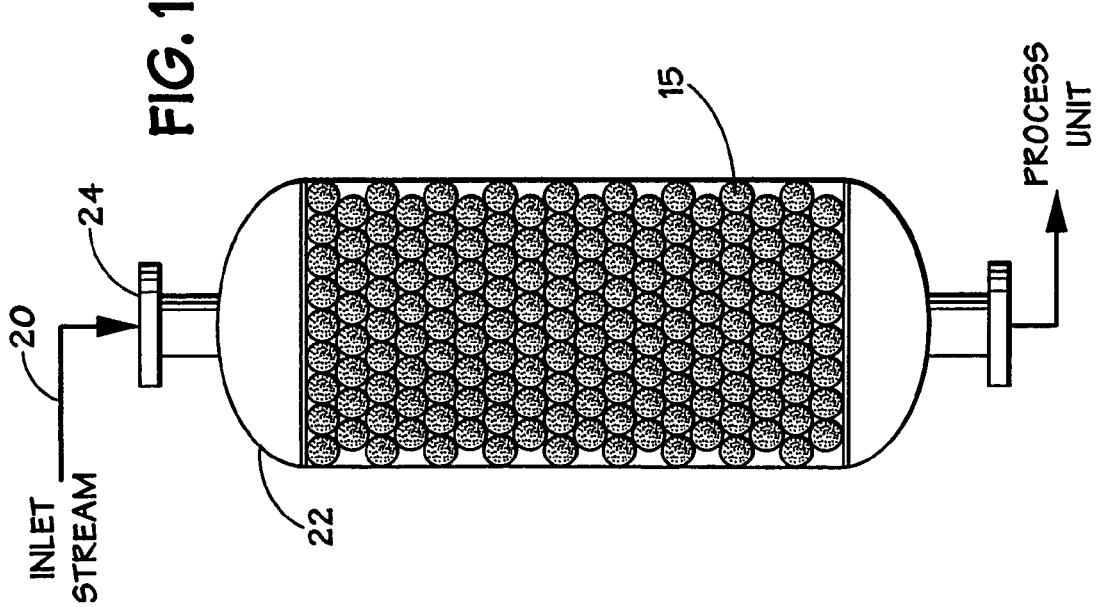
FIG. 1 is a partial cross-sectional side view of a guard filter with a plurality of reticulated elements contained therein in accordance with an embodiment of the present invention.
Figure 3B:
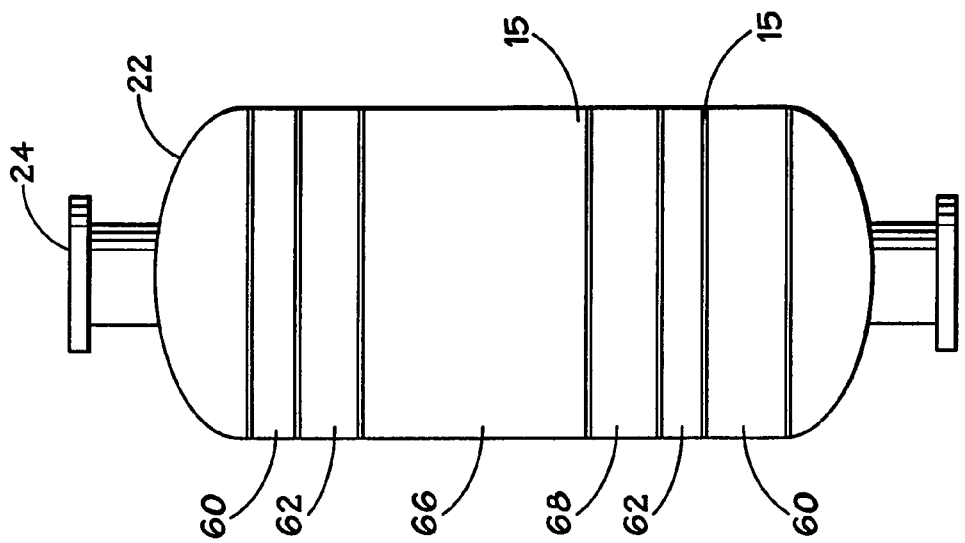
FIG. 3b is a partial cross-sectional side of a guard filter containing layers of conventional filter media, in accordance with prior art.
Figure 3A:
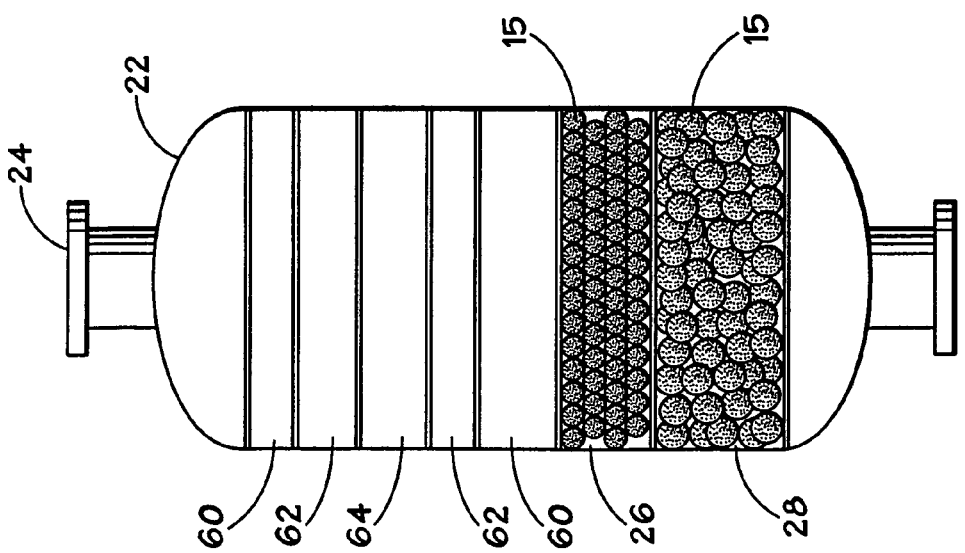
FIG. 3a is a partial cross-sectional side of a guard filter containing a plurality of reticulated elements in layers, along with layers of conventional filter media, in accordance with an embodiment of the present invention.
Figure 4:
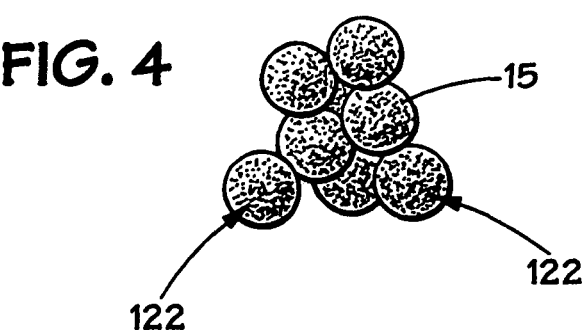
FIG. 4 is a perspective view of balls made of reticulated material in accordance with an embodiment of the present invention.
Figure 5:
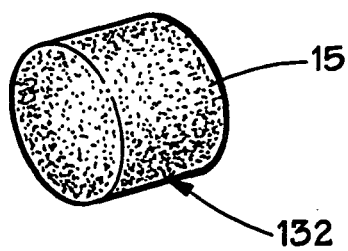
FIG. 5 is a perspective view of a cylinder made of reticulated material in accordance with an embodiment of the present invention.
Figure 7:
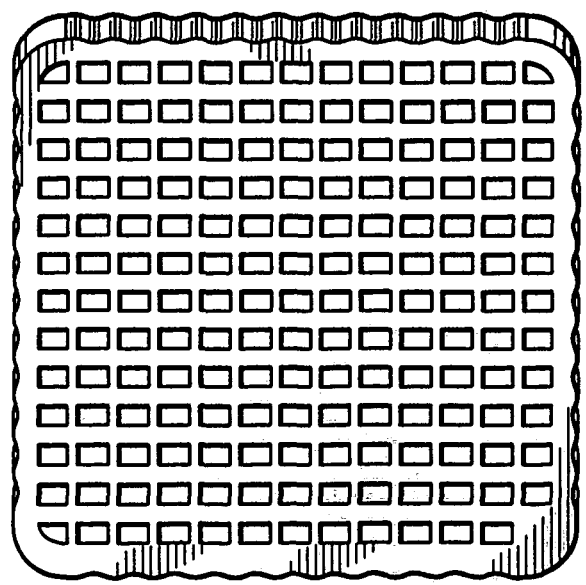
FIG. 7 is a perspective view of a monolith made of reticulated material in accordance with an embodiment of the present invention.

With reference to FIGS. 1 and 3a, for treatment of a process stream a single fixed guard filter 22 with reticulated elements 15 in the shape of substantially spherical balls will be described, although as previously discussed other shapes of the reticulated elements 15 can be used. One or more layers 26, 28 of reticulated elements 15 are provided in the vessel in an amount sufficient to filter the contaminants from the process or inlet stream 20 for as long as desired, as shown in FIG. 3a. Preferably, multiple layers 26, 28 can be provided wherein the size of the reticulated elements 15, such as balls 122 in FIG. 4, is graduated from one porosity in layer 26 to another porosity in layer 28 as the incoming process stream flows through the bed of reticulated elements 15. Reticulated elements can include foam materials such as shown in FIG. 5 and monolith materials, such as shown in FIG. 7. Foam materials generally have a random pattern of openings or passageways, while the monoliths have a more uniform pattern of openings or passageways. If a reticulated ceramic element is used, the reticulated ceramic elements can be made from any commercially available materials, for example, zirconia toughened alumina, commonly referred to as ZTA. ZTA is available from Fiber Ceramics, Inc. headquartered in Cudahy, Wis. An exemplary monolith for use in the present invention is available from Corning, Inc. headquartered in Corning, N.Y. The graduated sizing of the reticulated elements 15 and graduated porosity, as shown in FIG. 3a, allow the filtering of a broad range of sizes of contaminants.

Figure 2:
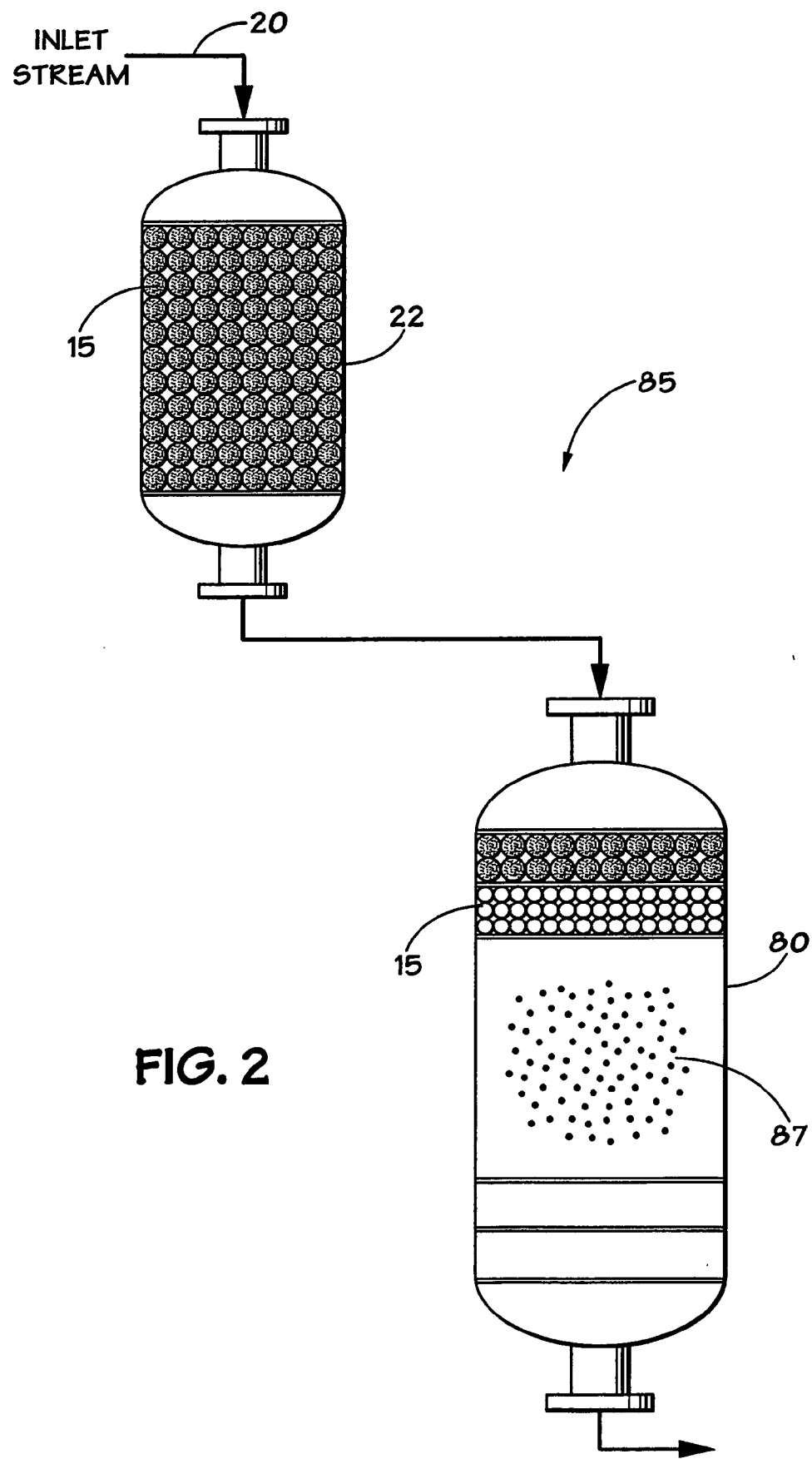
FIG. 2 is a partial cross-sectional side of a process unit assembly containing a guard filter containing a plurality of reticulated elements located upstream of a reactor, also containing a plurality of reticulated elements, in accordance with an embodiment of the present invention.

The present invention advantageously provides a method of removing contaminants from a process stream. To remove contaminants from a process stream in this embodiment, a plurality of reticulated elements 15 in a guard filter 22 is provided, as shown in FIG. 1. In all embodiments of the present invention, the plurality of reticulated elements 15 are preferably randomly packed with the guard filter 22, as shown in FIG. 3a. The guard filter 22 is preferably located upstream of a process unit 80, as illustrated in FIG. 2, in which a decontaminated process stream can be processed, stored, transported or the like. The plurality of reticulated elements 15 is preferably randomly packed within the guard filter 22, which enables the plurality of reticulated elements 15 to provide enhanced filtration of contaminants within a process stream on a surface of the plurality of reticulated elements 15. Contaminants can be captured by the plurality of reticulated elements 15 on a surface area of the reticulated elements and within the pores of the plurality of the reticulated elements 15. The contaminated process stream is contacted with the plurality of reticulated elements 15 to remove contaminants from the contaminated process stream, while allowing the contaminated process stream to pass unimpeded through the plurality of reticulated elements 15, which produces a substantially decontaminated process stream. The pressure drop experienced by the contaminated process stream is substantially eliminated when using a plurality of reticulated foam elements when compared with conventional filter materials, such as graded rings, support, and/or catalyst. Once the process stream has been substantially decontaminated, the substantially decontaminated process stream can be sent to a process unit 80 for further processing, storage, transport, or the like.

In all embodiments of the present invention, the method of removing contaminants from a contaminated process stream can be used upstream of a process unit 80 selected from the group consisting of a chemical reactor, a distillation column, a tail gas treater, an incinerator, a tank, a vessel, a heat exchanger, a furnace, a packaging facility, a pipeline, a catalytic process unit, an extractor, a scrubber, a boiler, a condenser, and the like. The methods described herein can also be used for other types of process units 80 and equipment. Other suitable choices will be known to those of ordinary skill in the art of process units located in petrochemical and petroleum refining processes or in facilities utilized in other process industries and are to be considered within the scope of the present invention.

The step of contacting the contaminated process stream with the plurality of reticulated elements 15 can include substantially removing contaminants from a contaminated process stream. The present invention is capable of handling substantially contaminated process streams. The methods described herein are effective for a large range of contaminants within a process stream. Prior art filtering media are more limited as to the amount of contamination within a process stream that could be effectively filtered from the contaminated process stream before being replaced or rejuvenated.

Figure 11:
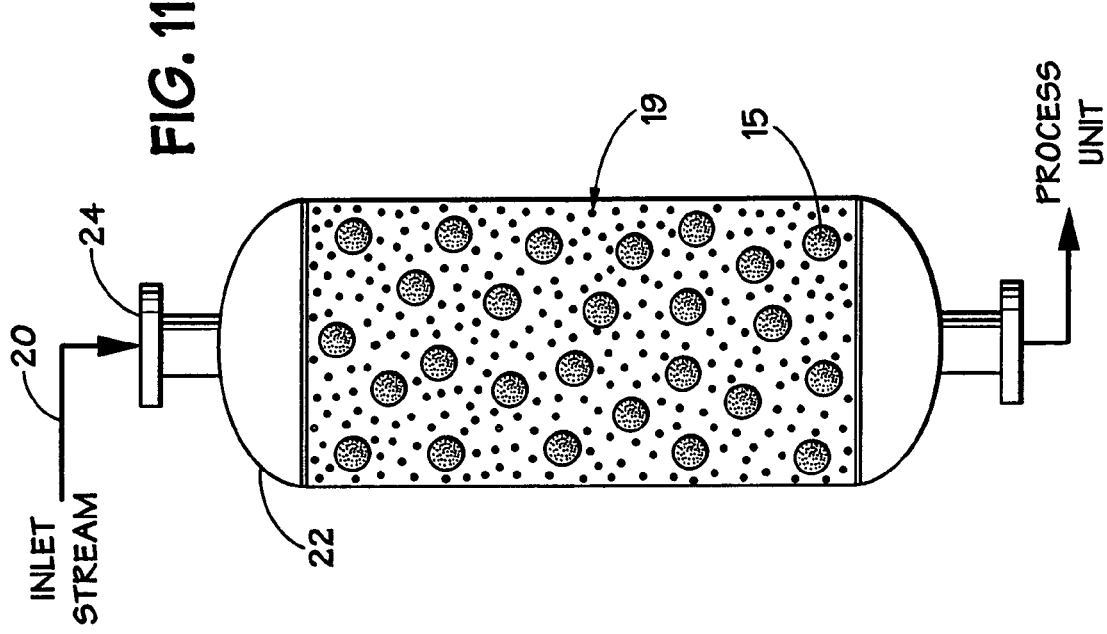
FIG. 11 is a partial cross-sectional side view of a guard filter having a plurality of reticulated elements intermingled with conventional filter media in accordance with an embodiment of the present invention.

The filter elements effective in the present invention can include a filter element selected from the group consisting of reticulated elements 15, and combinations of reticulated elements of the present invention and conventional filter media 19, as shown in FIG. 11. Examples of suitable conventional filter media 19 can include graded rings, support, catalyst, and combinations thereof. The filter elements 15 of the present invention can be constructed of a material selected from the group consisting of a ceramic material, a metallic material, a plasma deposition material, a polymeric material, a carbonaceous material, and a chemical vapor deposition material. The reticulated elements 15 can be formed from a material selected from the group consisting of a foam material and a monolith.

The reticulated elements 15 of the present invention can be layered with other materials or combined with other materials, as shown in FIG. 3a. For example, a layer containing a plurality of conventional filter media 60, 62, 64 can be disposed in the guard filter along with the plurality of reticulated elements 15. As another example, the reticulated elements 15 of the present invention can be mixed or intermingled with conventional filter media 19, as shown in FIG. 11.

Figure 6:
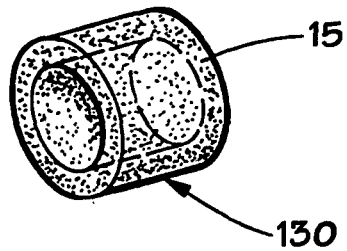
FIG. 6 is a perspective view of a hollow ring made of reticulated material in accordance with an embodiment of the present invention.
Figure 8:
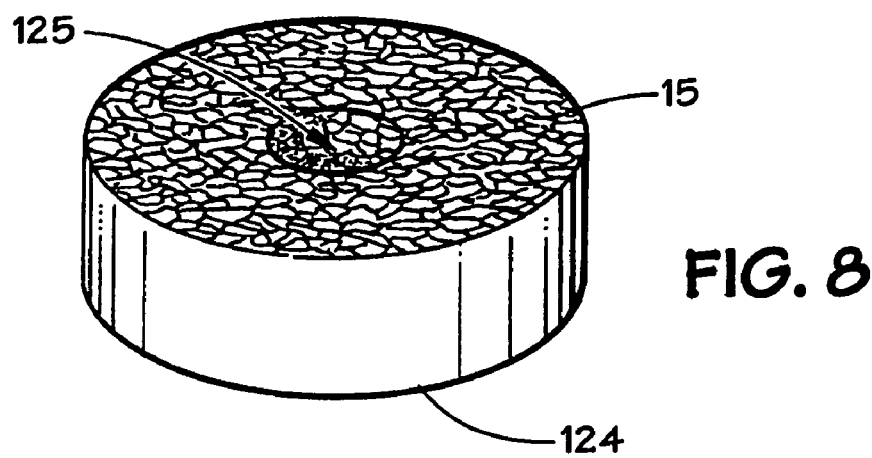
FIG. 8 is a perspective of a single disk made of reticulated material in accordance with an embodiment of the present invention.
Figure 9:
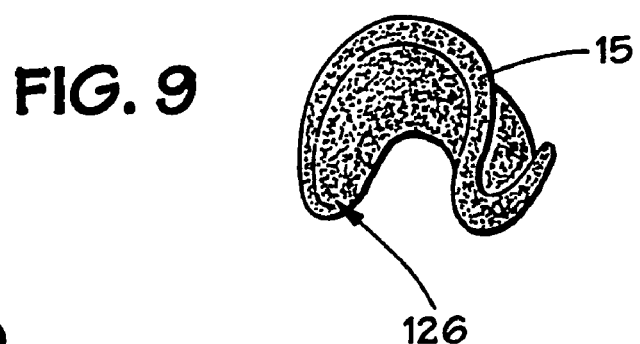
FIG. 9 is a perspective view of a saddle made of reticulated material in accordance with an embodiment of the present invention.
Figure 10:
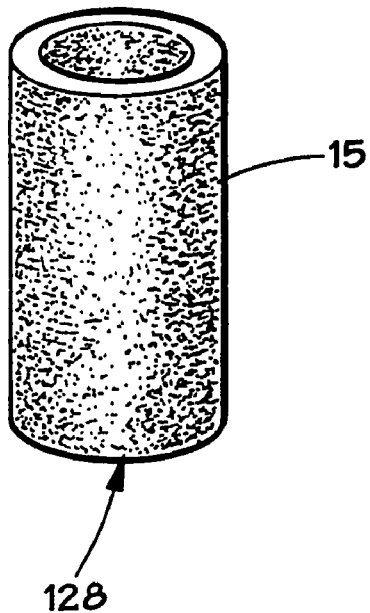
FIG. 10 is a perspective view of a raschig ring or hollow cylinder made of reticulated material in accordance with an embodiment of the present invention.
Figure 12:
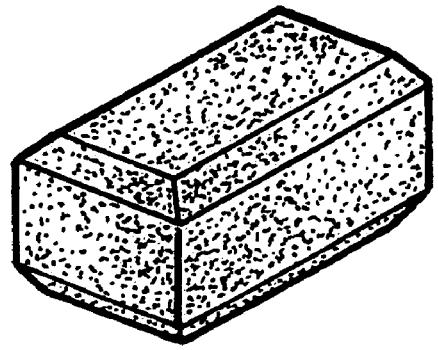
FIG. 12 is a top view of a briquette-shaped body made of reticulated material in accordance with an embodiment of the present invention.
Figure 13:
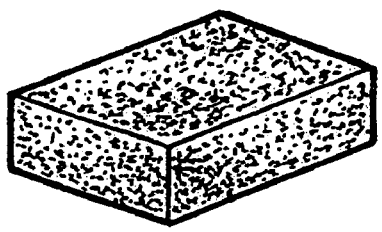
FIG. 13 is a perspective view of a rectangular-shaped body made of reticulated material in accordance with an embodiment of the present invention.
Figure 14:
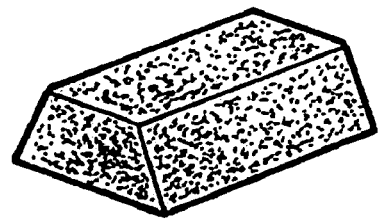
FIG. 14 is a perspective view of a trapezoidal shaped body made of reticulated material in accordance with an embodiment of the present invention.
Figure 15:
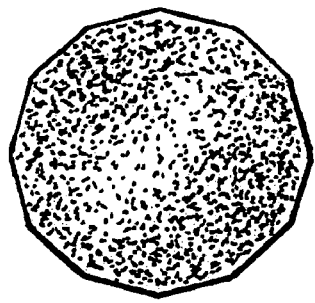
FIG. 15 is a side view of a dodecahedral shaped body made of reticulated material in accordance with an embodiment of the present invention.
Figure 16:
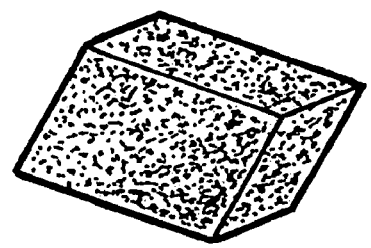
FIG. 16 is a perspective view of a rhomboidal shaped body made of reticulated material in accordance with an embodiment of the present invention.
Figure 17:
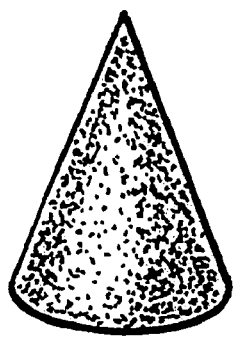
FIG. 17 is a side view of a conical shaped body made of reticulated material in accordance with an embodiment of the present invention.
Figure 18:
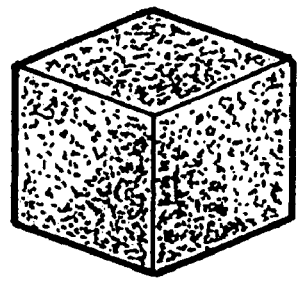
FIG. 18 is a perspective view of a cube shaped body made of reticulated material in accordance with an embodiment of the present invention.

The reticulated elements 15 in all embodiments of the present invention can preferably be shaped in the form of body selected from the group consisting of three dimensional bodies including substantially spherical shaped balls (FIG. 4), raschig rings (FIG. 10), saddle shaped pieces (FIG. 9), cubes (FIG. 18), rectangular shaped pieces (FIG. 13), trapezoidal shaped pieces (FIG. 14), dodecahedral shaped pieces (FIG. 15), rhomboidal shaped pieces (FIG. 16), conical shaped pieces (FIG. 17), briquette shaped pieces (FIG. 12), hollow cylinders (FIG. 6), cylinders (FIG. 5), and disks (FIG. 8). Sizes for the shapes used can include substantially spherical balls of about ⅛ to 2-inch diameters; monoliths with widths of about ⅛ to 2-inches and lengths of about ⅛ to 2-inches; bodies with widths of about ⅛ to 2-inches and lengths of about ⅛ to 2-inches; raschig rings with inside diameters of about ⅛ to 1 inch and outside diameters of about ¼ to ½ inches, and heights of about ¼ to 2 inches; saddle shapes with radii of about ¼ to 2 inches; hollow cylinders having inside diameters of about ⅛ to 1¼ inches, outside diameters of about ¼ to 2 inches, and heights of about ¼ to 3 inches; and cylinders having diameters of about ⅛ to 1 inch and heights of about ¼ to 2 inches.

As another embodiment of the present invention, the present invention advantageously provides a method of removing contaminants from a process stream. In this embodiment, a plurality of reticulated elements is provided in a vessel or guard filter 22. As shown in FIG. 2, which is not drawn to scale, the vessel 22 is preferably located upstream of a process unit in which a substantially decontaminated process stream can be processed. The plurality of reticulated elements is advantageously randomly packed within the vessel 22 whereby the plurality of reticulated elements provides enhanced filtration of contaminants within a process stream on a surface of the plurality of reticulated elements as shown in FIG. 3b. The process stream travels through and around the plurality of reticulated elements so that the contaminants are trapped primarily inside the reticulated elements. Conventional filter media can be provided in a layer downstream of the plurality of reticulated elements. Upon exhaustion of the filtering capacity of the plurality of reticulated elements, the contaminants from the contaminated process stream will flow around the plurality of reticulated elements and enter and be trapped or filtered by the conventional filter media layer. Upon exhaustion of that layer, the pressure drop across the vessel will increase, signaling exhaustion of the filtering capability of the vessel. The operator of the vessel will then know that the filter system needs to be cleaned or replaced.

As another embodiment of the present invention, a process unit assembly 85 is advantageously provided, as shown in FIG. 2. The process unit assembly 85 preferably includes a vessel or guard filter 22 located upstream of a process unit 80 in which a substantially decontaminated process stream can be processed. The vessel 22 preferably has a plurality of randomly packed reticulated elements 15 with or without conventional filter media 19 and contained therein thereby providing a void space between a substantial number of the reticulated elements 15 to enhance filtration of contaminants within the contaminated process stream on a surface of the plurality of reticulated elements 15. When the contaminated process stream contacts a substantial number of the plurality of reticulated elements 15, contaminants within the contaminated process stream are substantially removed, thereby producing a substantially decontaminated process stream. The process unit 80 assembly also advantageously includes a process unit 80 located downstream of the vessel 22 for processing the substantially decontaminated process stream.

Data has been collected from different filter units that have tested with the reticulated elements 15 of the present invention. The reticulated elements 15 of the current invention have performed dramatically better than conventional deep bed filter media available commercially.

EXAMPLE 1

Use of Reticulated Elements in a Feed Filter

The use of reticulated elements 15 in a pre-filter vessel 22 in accordance with an embodiment of the present invention was compared with the use of conventional filter media in the pre-filter vessel 22. The reticulated elements 15 of the present invention were installed in a pre-filter vessel 22, as shown in FIG. 3a. Two layers of reticulated elements 26, 28 were installed in the vessel 22. Each layer 26, 28 of reticulated element had a different porosity. Along with the reticulated elements 15, conventional support media, including ⅜" inert balls 60, ¼" inert balls 62, and 1.6 mm diameter spent catalyst 64, was also installed in the vessel 22.

When the prior art filter media was installed in a pre-filter vessel 22, as shown in FIG. 3b, ⅜" inert balls 60, ¼" inert balls 62, and spent catalysts 66, 68 were installed in the vessel 22. When in operation with the prior art filter media installed, the pre-filter vessel 22 could only be operated for approximately two weeks before the vessel 22 had to be taken off-line for filter media replacement. This arrangement could not be successfully rejuvenated by backwashing. The contaminants would impede the flow through the filter, which would cause a substantial pressure drop. When the reticulated elements 15 were installed in accordance with an embodiment of the present invention, the vessel 22 surprisingly operated for seven months prior to being taken off-line for replacement. This arrangement was successfully backwashed to restore filtering capability every 3 to 4 weeks. Even after seven months of operations, the vessel 22 was operable. It is believed that the vessel 22 could have been able to operate longer without experiencing a substantial pressure drop across the vessel 22. The process unit installed and operated downstream of vessel 22 did not contain reticulated elements made in accordance with the present invention, the process unit located downstream of vessel 22 utilized conventional top bed materials.

Experience has shown that the reticulated foam used herein has a particulate holding capacity that is significantly greater than conventional filter media. For example, a six-inch depth of catalyst-type material (actual catalyst, spent catalyst, catalyst support and the like) is the reference point for determining particulate holding capacity, with a reading of one. When comparing the catalyst-type material with conventional rings at the same six-inch depth, the rings can hold up to four times the amount of particulates than the catalyst-type material can hold. At this depth, the reticulated foam elements used in the present invention can hold up to twelve times that of the catalyst-type material. As another example, at a twelve-inch depth, conventional catalyst-type material can hold 1 ½ times the amount of particulate contaminants than conventional catalyst-type material can hold at a depth of six inches. Twelve inches of the conventional rings can hold up to six times the amount of particulate contaminants that the conventional catalyst-type material can hold at a depth of six inches. Twelve inches of the reticulated foam elements can hold up to twenty-four times the amount of particulate contaminants as conventional catalyst-type material can hold at a depth of six inches. Deeper depths of catalyst-type material or conventional rings show virtually no increase in filtration capacity. On the other hand, the filtration capacity of reticulated foam elements continues to increase linearly with depth.

The structure of the reticulated foam elements inherently have a greater holding capacity, which is essentially limitless, because of the available inner surface area and outer surface area that is available on each of the reticulated foam elements.

Beds of reticulated elements of reticulated foam preferably include 85-90% void space, which is preferably split about 50/50 between the voids between the reticulated elements and the pores within the reticulated elements. Particulates in the process stream are trapped within the pores of the reticulated elements of the present invention, while the process stream itself continues to flow freely in the void spaces between the reticulated elements. The bed of reticulated elements of the present invention will require rejuvenation when its filtering capacity is exhausted. The depth of reticulated elements can be designed such that it will have a predictable life in a given service. Another way to express this is that the second foot of a reticulated element, particularly a reticulated foam element, bed has a filtering capacity that is virtually infinitely greater than the second foot of a conventional deep bed filter. It is believed that use of monolithic reticulated elements will perform substantially better than conventional prior art top bed materials.

An advantage of the use of reticulated elements in guard filters is their superior capacity to remove particulate contaminants from contaminated process. Whereas conventional filter media have very limited capacity and life, the reticulated elements have been found to have much higher capacity.

Whereas reticulated elements have been shown to have excellent filtering capacity for process streams with only minor levels of particulate contaminants (measured in the low parts per million range), using reticulated elements to filter process streams containing much higher levels of particulate contaminants (orders of magnitude higher than the minor levels) has been surprisingly successful.

Yet another demonstrated advantage of reticulated elements used to filter particulate contaminants from process streams is their ability to be rejuvenated via backwashing instead of wholesale replacement of conventional materials. Such replacement is required because conventional materials typically clog with an impenetrable layer of particulates.

It is to be understood that the invention is not to be limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed:

1. A process unit assembly comprising:
   (a) a non-reactive vessel located upstream of a process unit in which a contaminated process stream can be processed, the non-reactive vessel having a plurality of reticulated elements randomly packed and contained therein, the reticulated elements having a pore distribution range of about 4 to 800 pores per linear inch, thereby providing a void space between a substantial number of the reticulated elements to enhance filtration of contaminants within the contaminated process stream on a surface of the plurality of reticulated elements so that when the contaminated process stream contacts a substantial number of the plurality of reticulated elements contaminants within the contaminated process stream are substantially removed in a non-reactive manner, thereby producing a substantially decontaminated process stream; and (b) a process unit located downstream of the vessel for processing the substantially decontaminated process stream.

2. The process unit assembly of claim 1, wherein the reticulated elements comprise a material selected from the group consisting of a ceramic material, a metallic material, a plasma deposition material, a carbonaceous material, and a chemical vapor deposition material.

3. The process unit assembly of claim 1, wherein the reticulated elements are formed from a material selected from the group consisting of a foam material and a monolithic material.

4. The process unit assembly of claim 1, wherein the downstream process unit is selected from the group consisting of a chemical reactor, a distillation column, a tail gas treater, an incinerator, a tank, a vessel, a heat exchanger, a furnace, a packaging facility, a pipeline, a catalytic process unit, an extractor, a scrubber, a boiler, a reboiler, a separator, a cooling tower, and a condenser.

\* \* \* \* \*